Patented Oct. 2, 1928.

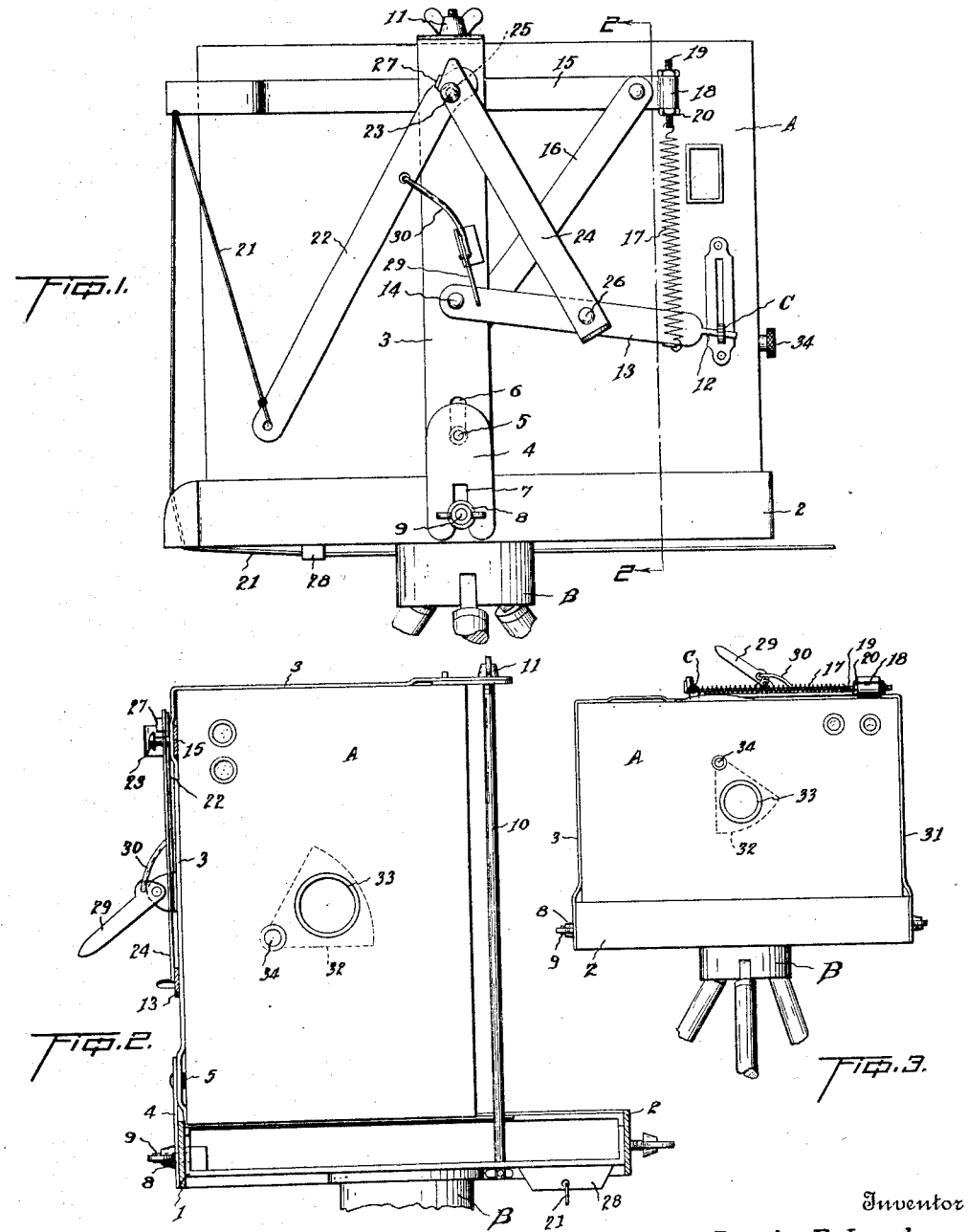

1,685,774

UNITED STATES PATENT OFFICE.

AMEDEE DE LAND, OF RIVER ROUGE, MICHIGAN.

SHUTTER-OPERATING ATTACHMENT FOR CAMERAS.

Application filed November 5, 1927. Serial No 231,369.

This invention relates to an attachment for cameras and more particularly to an operating device which may be applied to the ordinary snap shot camera for operating the same at a distance. An object of the invention is to provide an attachment which may be quickly and easily applied to an ordinary camera and which may be operated by means of a cord, from a distance to operate the shutter of the camera and thus permit the operator to take his own picture. A further object is to provide a simple device which is cheap to manufacture and which includes a signal for indicating the operation of the camera. It is also an object of the invention to provide an attachment which may be applied to an ordinary snap shot camera to operate the same in either position of its setting for taking a picture with the length of the picture in either a horizontal or vertical position, and to provide certain other new and useful features in the construction and arrangement of parts.

With the above and other ends in view, the invention consists in the matters hereinafter set forth and more particularly pointed out in the appended claims, reference being had to the accompanying drawing, in which Figure 1 is a side elevation of a camera and its supporting stand with an attachment applied thereto and in operative position, illustrative of the present invention;

Fig. 2 is a front end elevation of the camera with the attachment in transverse section substantially on the line 2—2 of Fig. 1, and Fig. 3 is a front elevation with the camera in a horizontal position.

This invention relates to an attachment for an ordinary box or snap shot camera A so that the camera may be snapped at a distance thus permitting the operator to appear in the picture, and for this purpose the camera is supported upon the usual tripod B. Fixed to the head of the tripod is a suitable rectangular frame 1 provided with a marginal upstanding flange 2 of a dimension to receive the camera box A which is placed thereon within the upstanding flange in either of its desired positions, that is in a position to take the picture with the length of the picture in vertical position, as shown in Figs. 1 and 2, or with the length of the picture in a horizontal position as shown in Fig. 3.

After the camera box has been placed upon the supporting frame 1, it is clamped firmly within the frame by means of a yoke 3 or band which extends upwardly in contact with one side of the camera box and across the top thereof, the box being placed in position shown in Figs. 1 and 2. One end of this clamp or strap 3 is attached to the frame 1 by means of a short attaching member 4 having at one end a bolt or rivet 5 to engage within a slot 6 in the strap 3 and the opposite end of the member 4 is slotted inwardly as at 7 to be engaged beneath a winged nut 8 upon a stud 9 projecting laterally from the side of the frame 1. The opposite end of the strap 3 is engaged by a rod 10 having suitable connection at its lower end with the frame 1 and extending upwardly alongside of the camera with a winged nut 11 applied to the screwthreaded upper end of the rod which engages an opening or slot in the end of the strap. The camera is thus by means of this strap securely and firmly held in place upon the frame 1.

In order to operate the usual shutter operating lever C of the camera with a quick movement, said lever C is provided in its projecting end with an opening to receive a finger 12 on the end of a lever 13 which is pivoted at its opposite end, as at 14, to the strap 3 to swing parallel with the side of the camera box. A supporting frame is formed by means of a rigid bar 15 extending at right angles to the strap 3 and securely fixed thereto intermediate its ends and this frame also includes a brace member 16 which is secured at one end to the strap 3 and extends at an angle thereto with its opposite end secured adjacent the end of the bar 15, said bar and brace thus together forming a rigid support for the attachment thereto of a coiled spring 17, the end of the bar 15 being formed with an eye 18 to receive an adjusting screw 19 extending therethrough with adjusting nuts 20 thereon engaging the ends of the eye, the spring 16 being attached to one end of the adjusting screw and at its opposite end to the swinging end of the pivoted operating bar 13.

The end of the bar 15 opposite that to which the spring is attached, forms a guide for a small cord or thread 21, this thread being passed through an opening in the bar with its end fastened, to the free end of a lever 22 which is pivoted adjacent one end to a suitable stud 23 on the strap 3, and a latch bar 24 has a notch 25 adjacent one end to engage said stud 23 and at its opposite end is pivoted as at 26 to the arm 13, which operates the shutter of the camera. On the pivoted end of the lever 22 is an upstanding lug 27 arranged laterally of the stud 23 upon which the lever is pivoted so that in turning the lever said lug 27 will engage the projecting end of the latch bar 24 and disengage said latch bar from the stud.

The cord 21 which may be simply a stout thread is led downwardly from the rear end of the bar 15 to beneath the frame 1 through a suitable guide 28 and thence forwardly to any distance so that the operator after setting the camera by moving the arm 13 to set the lever C and latching this arm in the position to which it is moved by means of the latch bar 24 into engagement with the stud 23, and then by a pull upon the cord or thread 21 the lever 22 is swung upwardly and by this movement disengages the latch bar from the stud and permits the spring 17 to quickly move the shutter operating lever C to give the snap shot.

In order that the operator standing at a distance in front of the camera may know just when the camera is to be operated, a signal arm 29 is pivotally attached to the strap 3 at a short distance from the lever 22, said arm being pivotally attached adjacent one end to swing outwardly away from the side of the strap and camera box and to so swing this arm, a connecting link 30 is pivotally attached to the signal arm near its pivot and at its opposite end to the lever 22 so that when said lever is swung upwardly by a pull on the cord, the signal arm 29 will also be swung outwardly thus signalling to the operator that the latch bar is just about to be released and the snap shot taken. When it is desired to take a picture with the length of the picture in a horizontal position, the camera box A is turned down within the frame 1, with its shutter operating lever C at the upper side of the box and said box is then secured in this position within the frame by means of the strap 3, one end of the strap being attached as before to the stud 9, and the opposite end of the strap being connected to a like stud 9 at the other side of the frame by means of an extension piece 31 at the other side of the camera. The camera may therefore be detachably secured within its supporting frame 1 on the tripod B in the desired position and the shutter of the camera operated in the same manner as when the camera is in the position shown in Figs. 1 and 2.

In order to insure that the light be absolutely excluded from the camera during the time that the camera is being set in position to take the shot, a slide or swinging shutter 32 indicated in dotted lines in Figs. 2 and 3 may be provided inside of the wall of the camera box to swing over the opening 33 which admits the light when the main shutter is operated, this auxiliary shutter 32 being operated by means of a stud 34 projecting through the wall of the camera box so that after the camera has been set the operator may turn the stud 34 and thus swing the auxiliary shutter 32 from over the opening 33 and then the camera will be in condition to take a picture when the regular camera shutter is operated by means of the attachment described.

Obviously changes may be made in the manner and means for securing the camera in place upon its supporting frame 1 and other changes may be made in the construction and arrangement of parts, within the scope of the appended claims, without departing from the spirit of the present invention, and I do not therefore limit myself to the particular construction shown.

What I claim is:—

1. An attachment for cameras including a base frame to receive the camera box, a strap embracing the camera box and detachably attached to the base frame for holding the box within the frame and lever mechanism carried by said strap for operating the camera shutter.

2. An attachment for cameras including a frame structure to receive and detachably hold the camera box and lever mechanism carried by said frame structure for operating the camera shutter.

3. An attachment for cameras including a frame structure for receiving and holding detachably, a camera box, an operating lever pivotally attached to said frame structure and having engagement with the camera shutter operating lever, a latch mechanism carried by said frame structure and operatively connected with said operating lever to be operated by a pull cord to release the operating lever.

4. A camera attachment comprising a frame structure adapted to receive and hold a camera box, an operating lever carried by said frame structure and having operative engagement with the camera shutter operating lever, a spring connected to said operating lever, a latch bar to hold the operating lever against the action of said spring, a lever member for releasing the latch bar and a cord for operating said lever.

5. An attachment for cameras as characterized in claim 4, including a swinging signal member carried by said frame structure and connected to one of said levers to be operated thereby and indicate the operation of the camera shutter operating lever.

6. An attachment for cameras including a rectangular frame adapted to be secured to and supported by a tripod and to receive and hold a camera box, means for detachably securing the camera box in place upon said frame and including a strap to embrace said box, lever mechanism carried by said strap for operating the camera shutter, said lever mechanism including a latch bar and a cord operated releasing member to release the latch bar, said lever mechanism being arranged to swing in planes parallel to a side of the camera box and adjacent thereto.

7. An attachment for cameras including a rectangular frame adapted to be secured to a tripod and to receive a camera box in either of its positions for taking pictures with their greatest length in either a vertical or horizontal position, a strap embracing said camera box and detachably secured to said frame and lever mechanism for operating the camera shutter, said lever mechanism including an operating lever pivotally attached at one end to said strap and operatively engaged at its opposite end with the camera shutter operating lever, a latch bar for controlling the operation of the operating lever, a releasing lever pivotally attached to the strap to release the latch bar, and a cord attached to the free end of the releasing lever.

8. An attachment for cameras including a supporting frame and strap detachably attached to said frame and embracing a camera box, an operating lever pivotally attached at one end to said strap and having a finger at its opposite end to engage and operate the camera shutter operating lever, a cross bar secured to the strap, a spring adjustably secured at one end to the cross bar and engaging the operating lever at its opposite end, a latch bar pivoted to the operating lever intermediate the ends of said lever and having a notch adjacent its opposite end, a stud on the strap to be engaged in the notch of the latch bar, a releasing lever pivoted upon said stud adjacent one end and having a projection adapted to engage the adjacent end of the latch bar and release the same from the stud and a cord attached to the free end of the releasing lever to turn the same upon its pivot and release the latch bar.

In testimony whereof I affix my signature.

AMEDEE DE LAND.